(12) United States Patent
Stevens et al.

(10) Patent No.: US 10,578,171 B2
(45) Date of Patent: Mar. 3, 2020

(54) MORNING SICKNESS VALVE SYSTEM FOR VISCOUS CLUTCH

(71) Applicant: Horton, Inc., Roseville, MN (US)

(72) Inventors: Michael Stevens, St. Paul, MN (US); James R. Preston, Minneapolis, MN (US)

(73) Assignee: HORTON, INC., Roseville, MN (US)

( * ) Notice: Subject to any disclaimer, the term of this patent is extended or adjusted under 35 U.S.C. 154(b) by 107 days.

(21) Appl. No.: 15/758,517

(22) PCT Filed: Oct. 4, 2016

(86) PCT No.: PCT/US2016/055260
§ 371 (c)(1),
(2) Date: Mar. 8, 2018

(87) PCT Pub. No.: WO2017/062330
PCT Pub. Date: Apr. 13, 2017

(65) Prior Publication Data
US 2018/0252275 A1   Sep. 6, 2018

Related U.S. Application Data

(60) Provisional application No. 62/237,286, filed on Oct. 5, 2015.

(51) Int. Cl.
*F16D 35/02* (2006.01)
*F16K 17/36* (2006.01)

(52) U.S. Cl.
CPC ......... *F16D 35/024* (2013.01); *F16D 35/021* (2013.01); *F16D 35/025* (2013.01); *F16K 17/36* (2013.01); *F16D 2300/0212* (2013.01)

(58) Field of Classification Search
CPC .... F16D 35/024; F16D 35/021; F16D 35/025; F16K 17/36
See application file for complete search history.

(56) References Cited

U.S. PATENT DOCUMENTS

| 3,444,748 A | 5/1969 | Sutaruk |
| 3,498,431 A | 3/1970 | Sutaruk |

(Continued)

FOREIGN PATENT DOCUMENTS

| DE | 2439256 A1 | 2/1976 |
| DE | 19741073 A1 | 3/1999 |

(Continued)

OTHER PUBLICATIONS

International Search Report and Written Opinion of the International Search Authority dated Dec. 9, 2016, for corresponding International Application PCT/US2016/055260 filed Oct. 4, 2016.

(Continued)

*Primary Examiner* — Stacey A Fluhart
(74) *Attorney, Agent, or Firm* — Westman, Champlin & Koehler, P.A.

(57) ABSTRACT

A valve system (44) for reducing morning sickness effects in a viscous clutch (20) having a reservoir (38) with a bore (46-1) includes a valve element (44-1), a counterweight portion (44-2), a pivot (44-3), and a biasing member (44-4). The pivot is located in between the valve element and the counterweight portion, and the valve element and the counterweight portion are configured to commonly move about the pivot between open and closed positions. The biasing member is configured to bias the valve element to cover the bore in the closed position by default. The counterweight portion is configured to counteract the biasing member under centrifugal loading such that the valve element at least partially uncovers the bore in the open position.

18 Claims, 6 Drawing Sheets

(56) References Cited

U.S. PATENT DOCUMENTS

| | | | |
|---|---|---|---|
| 3,642,105 A * | 2/1972 | Kikuchi | F16D 35/025 |
| | | | 192/58.6 |
| 3,773,157 A | 11/1973 | Koch, Jr. | |
| 3,819,020 A | 6/1974 | Smith | |
| 3,840,101 A | 10/1974 | Peter | |
| 3,893,555 A | 7/1975 | Elmer | |
| 4,246,995 A | 1/1981 | Gee | |
| 4,318,311 A | 3/1982 | Ross | |
| 4,346,797 A | 8/1982 | Bopp | |
| 4,362,226 A | 12/1982 | Gee | |
| 4,467,747 A | 8/1984 | Braatz | |
| 4,544,053 A | 10/1985 | Yamaguchi et al. | |
| 4,570,771 A * | 2/1986 | Yamaguchi | F16D 35/026 |
| | | | 192/103 F |
| 4,690,191 A | 9/1987 | Kawasaki | |
| 4,727,969 A | 3/1988 | Hayashi | |
| 4,832,078 A | 5/1989 | Szekely | |
| 4,846,325 A | 7/1989 | Mohan | |
| 4,903,805 A | 2/1990 | Ono | |
| 4,924,986 A | 5/1990 | Elmer | |
| 4,930,457 A * | 6/1990 | Tamai | F16D 35/026 |
| | | | 123/41.12 |
| 4,930,458 A * | 6/1990 | Takikawa | F16D 35/022 |
| | | | 123/41.12 |
| 4,969,920 A | 11/1990 | Kennedy | |
| 5,004,085 A | 4/1991 | Taureg | |
| 5,022,507 A | 6/1991 | Kennedy | |
| 5,042,629 A | 8/1991 | Elmer | |
| 5,101,950 A | 4/1992 | Schoenmeyer | |
| 5,113,987 A | 5/1992 | Drennen et al. | |
| 5,152,383 A | 10/1992 | Boyer et al. | |
| 5,400,823 A | 3/1995 | Elmer | |
| 5,558,192 A | 9/1996 | Muehlbach et al. | |
| 5,839,558 A | 11/1998 | Kennedy | |
| 5,855,265 A | 1/1999 | Kennedy | |
| 6,056,098 A | 5/2000 | Brown | |
| 6,085,881 A | 7/2000 | Robb | |
| 6,408,621 B1 | 6/2002 | Moser | |
| 6,935,478 B2 | 8/2005 | Dräger | |
| 7,318,510 B2 | 1/2008 | Heinle | |
| 7,600,623 B1 | 10/2009 | Pinto | |
| 7,854,307 B2 | 12/2010 | Hennessy | |
| 7,913,826 B2 | 3/2011 | Boyer | |
| 7,938,240 B2 | 5/2011 | Hennessy | |
| 7,946,400 B2 | 5/2011 | Hennessy | |
| 8,100,241 B2 | 1/2012 | Hennessy | |
| 8,376,903 B2 | 2/2013 | Pohl | |
| 8,701,852 B2 | 4/2014 | Boyer | |
| 8,881,881 B2 | 11/2014 | Gevers | |
| 8,887,888 B2 | 11/2014 | Hennessy | |
| 9,239,086 B2 | 1/2016 | Kubota | |
| 9,316,272 B1 | 4/2016 | Gwin | |
| 9,328,781 B2 | 5/2016 | Kubota | |
| 9,587,683 B2 | 3/2017 | Gwin | |
| 2003/0230460 A1 | 12/2003 | Usui | |
| 2004/0084273 A1 | 5/2004 | May et al. | |
| 2010/0025177 A1 | 2/2010 | Fukushima et al. | |
| 2014/0216881 A1 | 8/2014 | Tilly | |
| 2014/0356102 A1 | 12/2014 | Sayre | |
| 2015/0240888 A1 | 8/2015 | Schmidt et al. | |
| 2016/0266583 A1 | 9/2016 | Light | |

FOREIGN PATENT DOCUMENTS

| | | |
|---|---|---|
| DE | 19925132 A1 | 12/2000 |
| EP | 1418361 A2 | 5/2004 |
| GB | 2087048 A | 5/1982 |
| JP | H07224862 A | 8/1995 |
| JP | 2001254760 A | 9/2001 |
| JP | 2003278802 A | 10/2003 |
| WO | WO2001014747 A1 | 3/2001 |
| WO | WO2001014759 A1 | 3/2001 |
| WO | WO2010070414 A2 | 6/2010 |
| WO | 2014/004335 A1 | 1/2014 |
| WO | WO2014/004335 A1 | 1/2014 |
| WO | 2014159374 A1 | 10/2014 |
| WO | WO2014158397 A1 | 10/2014 |
| WO | WO2018004833 A1 | 1/2018 |

OTHER PUBLICATIONS

Chinese Office Action issued in corresponding Chinese application No. 201680070513.7, dated Jun. 19, 2019.
Extended European Search Report issued in Corresponding European Patent Application No. EP16854152, dated Feb. 4, 2019.
Chinese Office Action issued in corresponding Chinese application No. 201680057783.4, dated Mar. 14, 2019.
Chinese Office Action issued in corresponding Chinese application No. 201680057895.X, dated Mar. 13, 2019.
Extended European Search Report dated May 29, 2019, in corresponding European patent application No. EP16854150.
"Cam". Wikipedia; https://web.archive.org/web/20150926025734/https://en.wikipedia.org/wiki/Cam (archived Sep. 26, 2015) (6 pages).
Supplementary European Search Report issued in Corresponding European Patent Application No. EP16871598, dated Jul. 29, 2019.

* cited by examiner

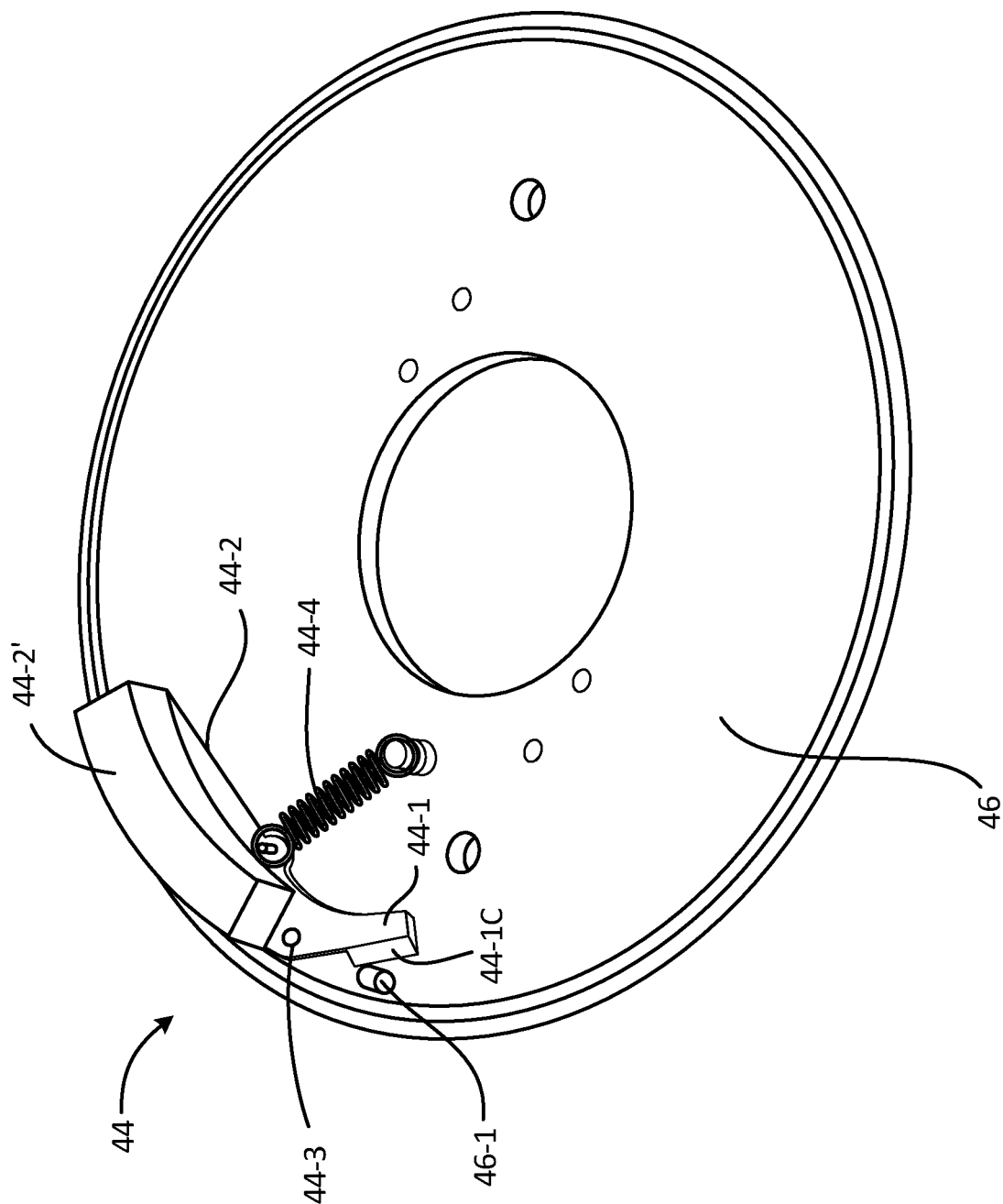

MORNING SICKNESS VALVE SYSTEM FOR VISCOUS CLUTCH

BACKGROUND

The present invention relates generally to valve systems, and, more particularly, to valve systems for use with viscous clutches to reduce "morning sickness" effects.

Viscous clutches are used in a wide variety of applications, such as for automotive fan drive applications. These clutches typically employ relatively thick silicone oil (more generally called shear fluid or viscous fluid) for the selective transmission of torque between two rotatable components. Engage or disengagement the clutch is made possible by selectively allowing the oil into and out of a working area of the clutch located between input and output members (e.g., between a rotor and a housing) where a viscous shear coupling can be created by the oil to transmit torque from the input member to the output member. A valve is used to control the flow of the oil into and/or out of the working area. Some recent clutch designs allow the oil to be stored in a reservoir attached to an input (e.g., a rotor located inside the housing and generally accepting a torque input at all times) while the clutch is disengaged, in order to keep kinetic energy available in the oil to allow rapid engagement of an outer output housing of the clutch from the disengaged/off condition, and to allow the clutch to have a very low output speed (e.g., fan speed) while the valve is positioned to obstruct oil flow into the working area.

One problem experienced with the use of viscous clutches is so-called "morning sickness" (also referred to by other terms such as "fan boom", "attendant rotation", etc.). When clutches are at rest when a motor is powered off (e.g., when on a vehicle that has been unused overnight), shear fluid can migrate from the reservoir to the working chamber. The degree of fluid migration to the working chamber often varies depending upon a rotational orientation of the clutch when at rest. In some rotational orientations, bores or other passageways within the clutch are at or near a lower portion of the clutch where gravity can urge significant amounts of the shear fluid through those bores or other passageways and into the working chamber. Upon startup of the motor, rotational input to the clutch can produce a significant degree of undesired engagement of the clutch output, due to the presence of migrated shear fluid in the working chamber. Such undesired clutch output engagement due to "morning sickness" can, for instance, produce a relatively high fan speed output (in fan clutch applications) with undesired fan noise, parasitic power losses, and excessive engine cooling. Although fluid in the working chamber due to "morning sickness" is generally pumped out of the working chamber to the reservoir quickly following a period of operation, it is desired to substantially avoid the "morning sickness" phenomenon entirely.

Therefore, it is desired to provide an alternative viscous clutch and/or valve system to address the "morning sickness" phenomenon.

SUMMARY

In one aspect of the present invention, a valve system for reducing morning sickness effects in a viscous clutch having a reservoir with a bore includes a valve element, a counterweight portion, a pivot, and a biasing member. The pivot is located in between the valve element and the counterweight portion, and the valve element and the counterweight portion are configured to commonly move about the pivot between open and closed positions. The biasing member is configured to bias the valve element to cover the bore in the closed position by default. The counterweight portion is configured to counteract the biasing member under centrifugal loading such that the valve element at least partially uncovers the bore in the open position.

In another aspect, a method for reducing morning sickness in a viscous clutch having an input member, an output member and a reservoir with a bore includes biasing a valve element carried with the input member to cover the bore of the reservoir by default, and pivoting the valve element to at least partially uncover the bore as a function of centrifugal loading.

The present summary is provided only by way of example, and not limitation. Other aspects of the present invention will be appreciated in view of the entirety of the present disclosure, including the entire text, claims and accompanying figures.

BRIEF DESCRIPTION OF THE DRAWINGS

FIG. 3 is a perspective view of another embodiment of a morning sickness valve system according to the present invention, shown in an open position.

Figure 1:
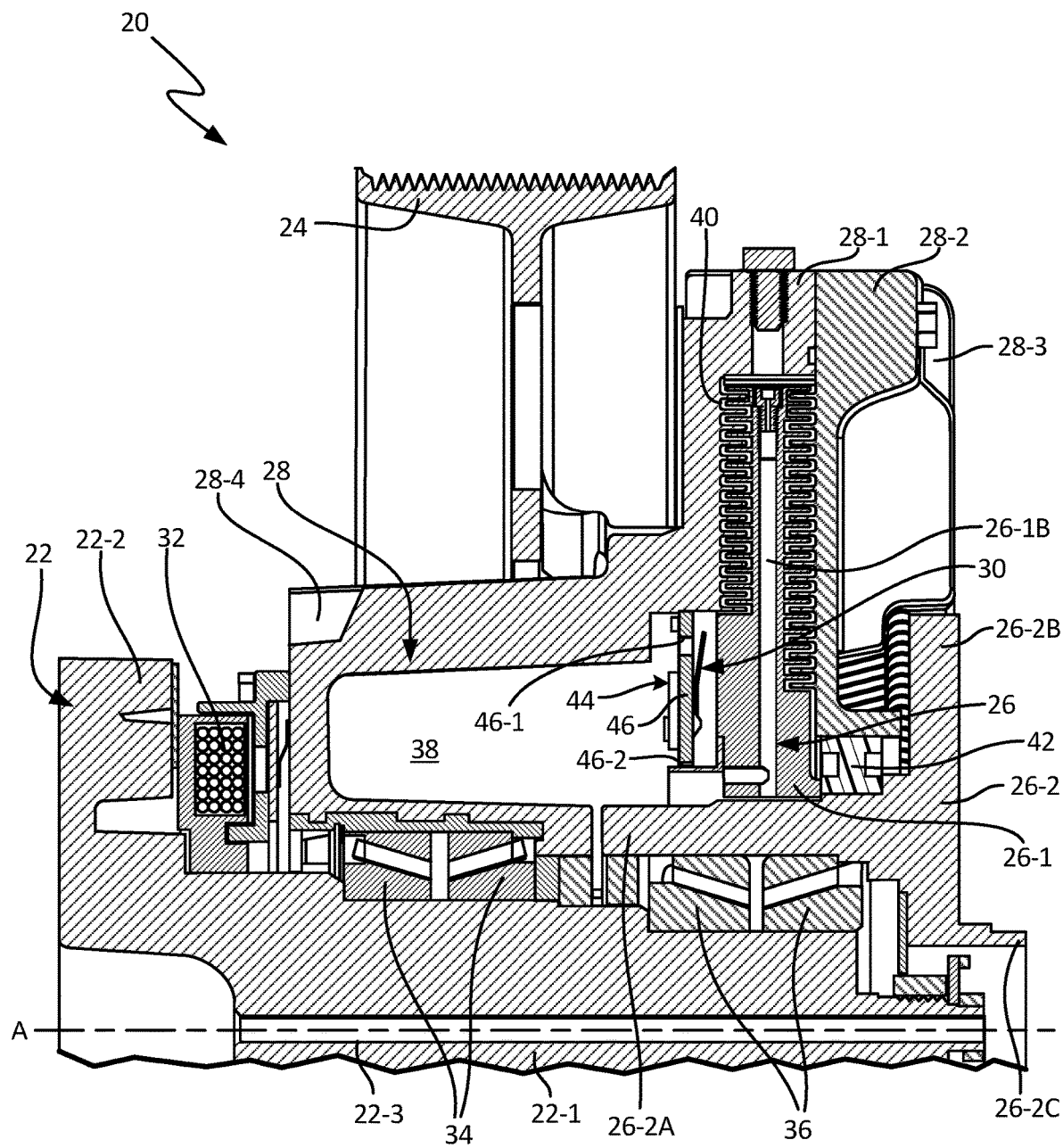
FIG. 1 is a cross-sectional view of an embodiment of a viscous clutch with a morning sickness valve system according to the present invention.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

In general, the present invention provides a valve system to help reduce or prevent so-called "morning sickness" when a viscous clutch receives a rotational input after a period of inactivity (i.e., an idle period). It is desirable for the viscous clutch to retain fluid in a reservoir when the clutch is not used for an extended period of time, such as when an engine that powers the clutch is turned off. If the fluid reservoir is not sealed, shear fluid may leak into a working chamber and cause excess output torque (e.g., to a fan or other output device) from the clutch the next time the engine is started. A morning sickness valve system can help selectively seal the reservoir to help retain shear fluid therein during idle/shutdown conditions, thereby reducing or eliminating the "morning sickness" phenomenon. Cam structures (e.g., face cam or linear cam structures) can be utilized in some embodiments to improve sealing of the morning sickness valve system. It should be noted that the morning sickness valve system of the present invention can be used with a variety of viscous clutch designs.

The present application claims priority to U.S. provisional patent application Ser. No. 62/237,286, which is hereby incorporated by reference in its entirety.

FIG. 1 is a cross-sectional view of a portion of an embodiment of a clutch 20 having a features to reduce or prevent so-called "morning sickness" phenomena, whereby shear fluid drainback or migration tends to cause undesired clutch engagement after a period of rest (i.e., an idle period without a torque input to the clutch 20). Only a portion of the clutch 20 above the axis of rotation A is shown in FIG. 1, for simplicity. Persons of ordinary skill in the art will appreciate that portions of the clutch 20 omitted in FIG. 1 below an axis of rotation A can have a generally similar configuration to the portion depicted above the axis A, with the understanding that embodiments of clutches often have certain conventional features that are not completely symmetrical about the axis of rotation A. In the illustrated embodiment, the clutch 20 includes a journal bracket (or mounting shaft) 22, a pulley (or sheave) 24, a rotor assembly 26, a housing assembly 28, a valve assembly 30, an electromagnetic coil assembly 32, first bearing sets 34, second bearing sets 36, a reservoir 38, a working chamber 40, a seal bearing 42, and a morning sickness valve system 44 (which can also be called a shutter valve). The clutch 20 defines an axis of rotation A. It should be noted that the embodiment of the clutch 20 shown in FIG. 1 is provided merely by way of example and not limitation. Those of ordinary skill in the art will recognize that numerous other viscous clutch designs are possible, and that the morning sickness valve system 44 can be utilized with a variety of viscous clutch designs.

The journal bracket (or mounting shaft) 22 can be a stationary (i.e., non-rotating) component that is secured to a desired mounting location, such as an engine block in a vehicle's engine compartment. In the illustrated embodiment, the journal bracket 22 includes an axially extending shaft portion 22-1 and a generally radially extending flange portion 22-2. A conduit 22-3 can optionally be defined through the journal bracket 22, and can extend along substantially an entire axial length of the shaft portion 22-1. As illustrated, the conduit 22-3 is coaxially aligned with the axis A. Electrical wires or other items can pass through the conduit 22-3, as desired for particular applications.

The housing assembly 28 of the illustrated embodiment is a multi-part assembly that includes a base 28-1 and a cover 28-2. The base 28-1 and the cover 28-2 can be secured together with any suitable means, such as using fasteners, welding, or the like. Cooling fins 28-3 can be provided on an exterior of the housing assembly 28 to help dissipate heat generated by the clutch 20 to ambient air. As shown in the embodiment of FIG. 1, a plurality of generally radially-extending, angularly-spaced cooling fins 28-3 are positioned on a front face of the cover 28-2. Additional generally radially-extending, circumferentially-spaced cooling fins 28-4 are located on an outer face of the base 28-1 of the housing assembly 28. In the illustrated embodiment, the housing assembly 28 is rotatably supported on the shaft portion 22-1 of the journal bracket 22 by the first bearing sets 34, and the housing assembly 28 generally encircles the shaft portion 22-1. The cover 28-2 of the housing assembly 28 can further be rotationally supported on the rotor assembly 26 by the bearing seal 42. The bearing seal 42 can provide both a fluidic sealing function and a structural rotational support function, such as in the form of a journal bearing. The housing assembly 28 can form part of an input member or torque-accepting portion of the clutch 20.

In the illustrated embodiment, the housing assembly 28 carries the reservoir 38, which rotates with the housing assembly 28. The reservoir 38 can hold a supply of a shear fluid (e.g., silicone oil) for use by the clutch 20, with a majority of the shear fluid held in the reservoir 38 when the clutch 20 is disengaged. Because the housing assembly 28 is part of an input subassembly, the housing assembly 28 always rotates whenever there is a rotational input to the housing assembly 28. Rotation of the housing assembly 28 in turn keeps the shear fluid under pressure while in the reservoir 38, allowing the shear fluid to be maintained at a relatively high level of kinetic energy to help facilitate quick engagement of the clutch 20. In one embodiment, the reservoir 38 can be provided as a generally annular cavity in the base 28-1 of the housing assembly 28. A reservoir cover 46 can be provided to define part of a boundary of the reservoir 38, that is, to act as a wall bounding a portion of the reservoir 38. In the illustrated embodiment, the reservoir cover 46 is configured as a generally annular plate attached to the base 28-1, such as by a press fit, swaging, the use of fasteners, or the like. One or more outlet bores (also called reservoir bores) 46-1 can be provided in the reservoir cover 46 (or alternatively, on another boundary portion or wall of the reservoir 38) to allow shear fluid out of the reservoir 38, and can be controlled by the valve assembly 30. In the illustrated embodiment, the outlet bore 46-1 is located at or near an outer diameter portion of the reservoir cover 46, such that the outlet bore 46-1 is at or near a radially outer portion of the reservoir 38. In that way, when the housing 28 and the reservoir 38 rotate and the shear fluid therein is pressurized, and tends to be located at the outer diameter of the reservoir 38 due to centrifugal force, the fluid can readily pass out of the outlet bore 46-1. A central opening 46-2 in the cover 46 can allow for search fluid to be returned to the reservoir 38. The location of the central opening 46-2 at a center or inner diameter portion of the cover 46 tends to reduce undesired fluid drainback out of the reservoir when the clutch 20 is at rest, because gravity will tend to force most or all of the shear fluid in the reservoir 38 below a level of the central opening 46-2.

The pulley (or sheave) 24 can be fixedly secured directly or indirectly to the housing assembly 28, such as to the base 28-1, and is configured to accept rotational input from a belt (not shown). The housing assembly 28 can co-rotate with the pulley 24. In the illustrated embodiment, the pulley 24 is axially positioned forward of the flange portion 22-2 of the journal bracket 22.

The rotor assembly 26 of the illustrated embodiment includes a disk 26-1, a bearing hub 26-2, and a flow guide 26-3. The disk 26-1 and the bearing hub 26-2 of the rotor assembly 26 can be configured as separate components fixedly secured together with a suitable connection, such as a press-fit, knurled, threaded, splined, or other connection, such that those components rotate together (i.e., co-rotate). In alternative embodiments, the disk 26-1 and the bearing hub 26-2 can be integrally and monolithically formed together. The rotor assembly 26 can be rotatably supported on the shaft portion 22-1 of the journal bracket 22 by the second bearing sets 36. As shown in FIG. 1, the rotor assembly 26 is positioned to generally encircle the shaft portion 22-1 of the journal bracket 22.

The disk 26-1 of the rotor assembly 26 can include a number of concentric annular ribs on both front and rear sides near an outer diameter portion in a conventional arrangement. Those annular ribs can complement similar ribs on the cover assembly 28 along the working chamber 40. In the illustrated embodiment, the disk 26-1 is enclosed by the housing assembly 28. One or more fluid openings (not shown) can be formed generally axially through the disk 26-1, such as near an outer diameter portion, in a conventional manner in order to permit shear fluid in the working chamber 40 to pass between front and rear sides of the disk 26-1. A return bore 26-1B can be provided through the disk 26-1. The flow guide 26-3 can be attached to the disk 26-1 and can traverse the reservoir cover 46, such as by passing through the central opening 46-2 in the reservoir cover 46.

In the illustrated embodiment of the rotor assembly 26, the bearing hub (also called a fan hub) 26-2 includes a generally axially-extending sleeve portion 26-2A, a generally radially-extending flange portion 26-2B, and a pilot portion 26-2C. The sleeve portion 26-2A can have a generally cylindrical shape, and can be generally axially aligned with both the disk 26-1 and the second bearing sets 36. The flange portion 26-2B and the pilot portion 26-2C can each at least partially extend beyond (or outside of) the housing assembly 28, such that the flange portion 26-2B, the pilot portion 26-2C and/or other portions of the bearing hub 26-2 of the rotor assembly 26 can provide a mounting surface for an output structure (e.g., fan, pump, shaft, etc.) at or near a front of the clutch 20. It should be noted, however, that in alternative embodiments the output structure could be mounted elsewhere.

The working chamber 40 (synonymously called a working area) is defined between the rotor assembly 26 and the housing assembly 28. In the illustrated embodiment the working chamber 40 extends along opposite front and rear sides of the disk 26-1, though in further embodiments the working chamber 40 could be limited to primarily one side of the disk 26-1. The presence of the shear fluid in the working chamber 40 creates a fluid friction coupling between the rotor assembly 26 and the housing assembly 28 to engage the clutch 20 and transmit torque between input and output components. An instantaneous percentage of torque transmission can vary as a function of the amount of shear fluid in the working chamber 40. Generally, the shear fluid is delivered to the working chamber 40 from the reservoir 38 along a fluid delivery path, and is returned to the reservoir 38 from the working chamber 40 through the return path. Persons of ordinary skill in the art will appreciate that the precise location and shape of the fluid delivery and return paths can each vary as desired for particular applications. One or more suitable pumping structures can be included at or along the working chamber 40 to dynamically pump the shear fluid out of the working chamber 40 through the return path.

The valve assembly 30 can be attached to and carried by the housing assembly 28. In general, the valve assembly 30 is a primary valve assembly used to selectively cover and uncover the opening outlet bore 46-1 from the reservoir 38. When the outlet bore 46-1 is uncovered (i.e., opened), the shear fluid is allowed to flow from the reservoir 38 to the working chamber 40 along the fluid delivery path. The valve assembly 30 can be biased to an open position by default, for instance using a spring bias force. Energizing the electromagnetic coil assembly 32 can actuate the valve assembly 30 to at least partially cover the outlet bore 46-1. Further description of the configuration and operation of a suitable valve assembly is found in commonly-assigned PCT Patent App. Pub. No. WO2014/047430. It should be noted, however, that numerous alternative types of valve assemblies can be utilized. For instance, a valve assembly is found in commonly-assigned PCT Patent App. Pub. No. WO2012/024497 can be used. Numerous other types of valve assemblies are suitable as well, including those with pivoting, rotating, translating, or otherwise movable valve elements.

The electromagnetic coil assembly 32 as shown in FIG. 1 can include one or more wound coils of high temperature insulated copper wire placed in a cup (e.g., a steel cup) used to direct the flux for actuation of the valve assembly 30. The coil 42 can be rotationally fixed relative to the journal bracket 22, and can be positioned adjacent to the housing assembly 28 and the valve assembly 30. In the illustrated embodiment, the coil 22 encircles and is supported by the shaft portion 22-1 of the journal bracket 22. In the illustrated embodiment, the coil assembly 32 is positioned generally rearward of the housing assembly 28 and the pulley 24, though the electromagnetic coil assembly 32 can be placed in other locations in alternative embodiments.

A variety of alternative control schemes are possible for operating the clutch 20. In one embodiment, the electromagnetic coil assembly 32 can be energized in a coarse on/off manner such that the valve assembly 30 tends to remain in either a fully open position (the default position) or a fully closed position when the coil assembly 32 is selectively energized. Because the valve assembly 30 is biased to the fully open position by default, the valve assembly 30 is open when the clutch 20 is idle and there is no power supplied to the coil assembly 32. In another embodiment, the coil assembly 32 can be energized using pulse width modulated (PWM) signals from an electronic engine controller (not shown). PWM signals allow a dynamically variable average volume of shear fluid to flow out of the reservoir 38. Depending on the pulse width (i.e., duration) and frequency of PWM signals, the valve assembly 30 can variably adjust the amount of shear fluid allowed to pass out of the reservoir 38 through the outlet bore 46-1 to the working chamber 40 over time. That is, the PWM signals cause the coil assembly 32 to open and close the valve assembly 30, and an average amount of time that the valve assembly 30 is open (i.e., uncovering the outlet bore 46-1) dictates the average amount of shear fluid that flows out of the reservoir 38. Greater pulse widths and/or greater frequencies of PWM signals will tend to close the valve assembly 30 more, on average, allowing lower average volumes of shear fluid to pass to the working chamber 40. This PWM control scheme permits the clutch 20 to be operated at selectively variable speeds, such that the rotor assembly 26 can rotate at anywhere from 0% to approximately 100% of the rotational speed of the housing assembly 28 and the pulley 24, rather than merely in a coarse and binary on/off fashion.

Under any of the control schemes described above, the valve assembly 30 can be biased open by default. In general, such a default valve configuration allows for a "fail on" configuration, with the clutch 20 engaged by default if there is a failure of the valve assembly 30 or the coil assembly 32, such as loss of electrical power supplied to the coil assembly 32. While a "fail on" configuration of the valve assembly 30 helps to promote engagement in the event of a vehicle or clutch failure, the default open position of the valve assembly 30 has the undesired effect of allowing the shear fluid to migrate or drain back to the working chamber 40 when the clutch 20 is idle, causing the well-known "morning sickness" phenomenon that leads to undesired clutch engagement upon the startup of an engine or vehicle that provides an initial torque input to the clutch 20 following the idle period.

The morning sickness valve system 44 is a secondary valve that can cover (and at least partially seal) the outlet bore 46-1 of the reservoir cover 46, to limit or prevent migration of the shear fluid from the reservoir 38 through the outlet bore 46-1 when the clutch 20 is at rest. As shown in the embodiment of FIG. 1, the valve system 44 is located on a rear side of the reservoir cover 46, while a valve arm or other valve element of the valve assembly 30 is located on a front side of the reservoir cover 46, such that valve system 44 and the valve assembly 30 are located at opposite side of the reservoir cover 46 at opposite ends of the outlet bore 46-1. In this way, the valve system 44 can be spaced from and operate independently from the valve assembly 30. In other words, the valve system 44 does not interfere with or otherwise limit movement and operation of the valve assembly 30. However, it should be noted that, in alternative embodiments, the front and rear positions of the valve system 44 and the valve assembly 33 can be reversed, or the valve system 44 can be in a different location, such as on the rotor assembly 26 (particularly for a clutch with a reservoir on or carried by the rotor).

More specifically, the valve system 44 can be a mechanically-actuated, pivoting valve that is centrifugally activated as a function of centrifugal force generated during operation of the clutch 20, such that below a selected speed threshold the valve system 44 can reduce or entirely stop the flow of the shear fluid from the reservoir 38 to the working chamber 40 through the outlet bore 46-1, while above the speed threshold the valve system 44 can allow flow of the shear fluid through the outlet bore 46-1. The valve system 44 is a secondary, mechanical control that is separate from the primary (e.g., electromagnetically-operated) valve assembly 30. In that way, the valve system 44 can independently override the primary valve assembly 30, in order to block the flow of the shear fluid through the outlet bore 46-1 under certain conditions in which the valve assembly 30 would otherwise allow flow of the shear fluid through the outlet bore 46-1. Having the valve system 44 spaced from and operating independently from the valve assembly 30 can help simplify operation by effectively avoiding direct interactions and mechanical interference, and helping to avoid a failure of one valve affecting operation of the other. Valves that interact and contact each other have the potential for one valve to undesirably limit the operation of the other, such as to undesirably lock the other valve into a particular state from which the clutch cannot recover (or can only recover from under limited circumstances). Independent valve operation therefore has numerous advantages.

Figure 2A:
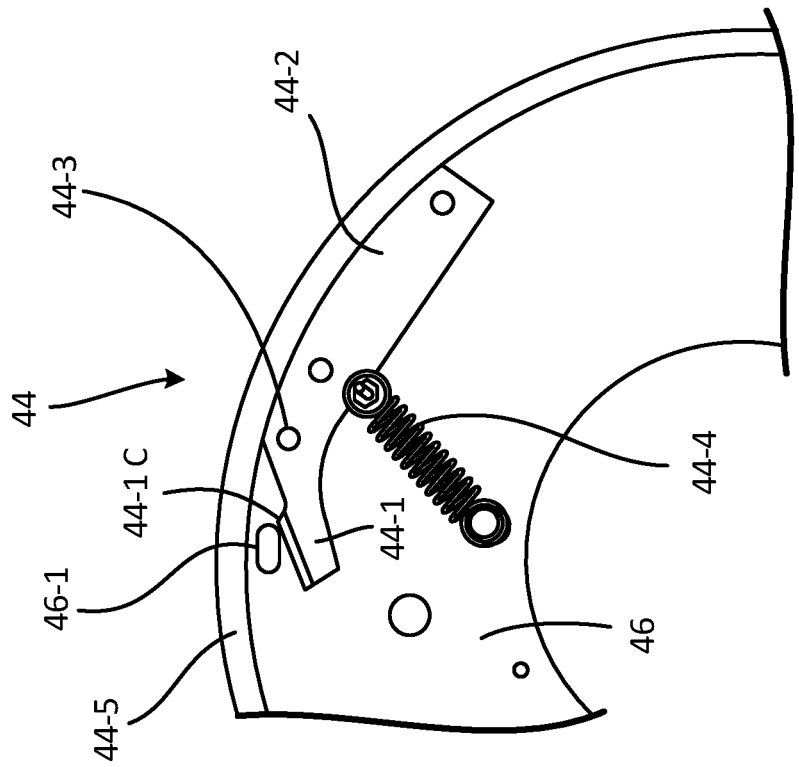
FIG. 2A is an elevation view of the valve system of FIG. 1, shown in a closed position.
Figure 2B:
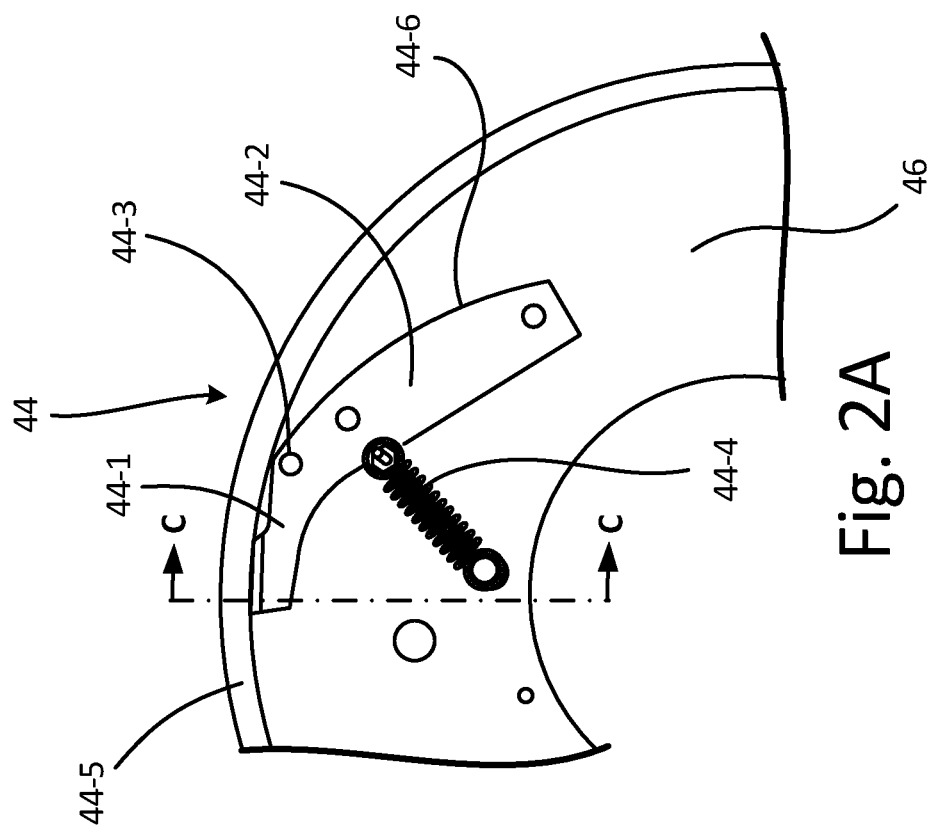
FIG. 2B is an elevation view of the morning sickness valve system of FIGS. 1 and 2A, shown in an open position.
Figure 2C:
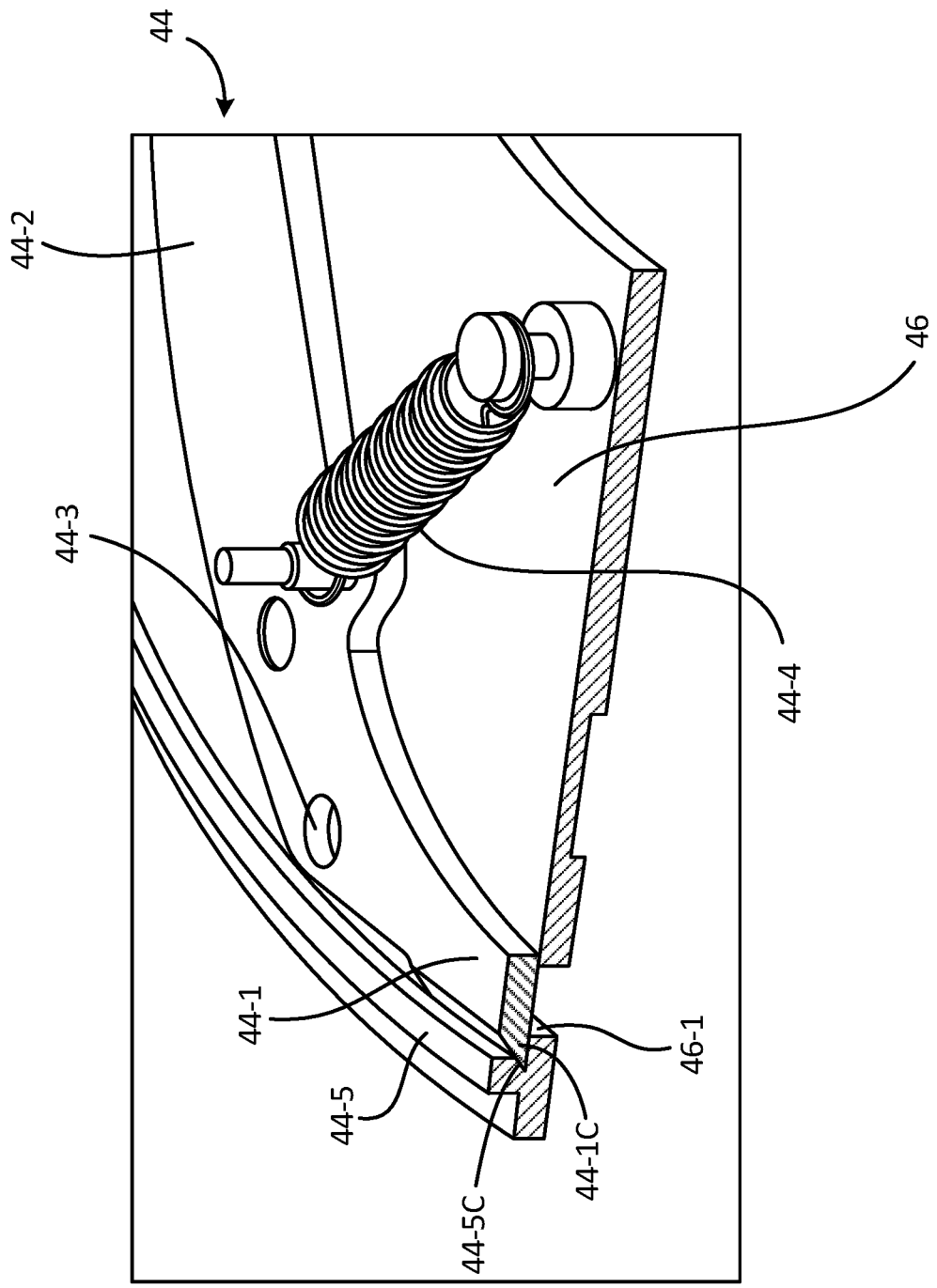
FIG. 2C is a cross-sectional perspective view of the morning sickness valve system of FIGS. 1-2B, taken along line C-C of FIG. 2A.

FIGS. 2A-2C illustrate further details of one embodiment of the morning sickness valve system 44. FIG. 2A is an elevation view of the valve system 44, shown in a closed position; FIG. 2B is an elevation view of the valve system 44, shown in an open position; and FIG. 2C is a cross-sectional perspective view of the valve system 44, taken along line C-C of FIG. 2A (in the closed position). It should be noted that the "open" position of the valve system 44 can include fully open and partially open positions, in various embodiments, although FIG. 2B shows only a fully open position.

In the illustrated embodiment shown in FIGS. 1-2C, the morning sickness valve system 44 includes a valve element 44-1, a counterweight portion 44-2, a pivot 44-3, a biasing member 44-4, and a contacting member 44-5. In general, the valve system 44 can be secured on or relative to the reservoir 38 of the clutch 20. As explained further below, the valve system 44 is actuated by centrifugal force, and therefore should be positioned on a reservoir 38 that is carried by an input the clutch 20. The clutch 20 described above and illustrated in FIG. 1 has the reservoir 38 in the housing 28, which is the input member of the clutch 20. However, in alternative embodiments, valve system 44 could be mounted on or relative to a reservoir carried by an input rotor.

The valve element 44-1 provides a body suitable to cover the outlet bore 46-1 to limit or prevent flow of the shear fluid through the outlet bore 46-1. The counterweight portion 44-2 is arranged opposite the valve portion 44-1 relative to the pivot 44-3, in other words, the pivot 44-3 is located in between the valve element 44-1 and the counterweight portion 44-2. As shown in the illustrated embodiment, the valve element 44-1 extends in a direction that is arranged at approximately 45° relative to the counterweight portion 44-2, with the angle of the valve element 44-1 swept inward (and/or away from the contacting member 44-5 and outer edge of the reservoir cover 46). Such an angle of the valve element 44-1 can help tailor operation of the valve system 44 under centrifugal loading, by making the valve element 44-1 less likely to resist opening under centrifugal loading. However, it should be noted that the valve element 44-1 and the counterweight portion 44-2 can be arranged in different orientations in further embodiments, though a range of the angle of the valve element 44-1 is preferably from 0° to less than 90°. The counterweight portion 44-2 and the valve element 44-1 are connected together to commonly pivot about the pivot 44-3. In the illustrated embodiment, the counterweight portion 44-2 and the valve element 44-1 are integrally and monolithically formed as part of a generally flat, elongate piece that is secured to the reservoir cover 46 by the pivot 44-3, which can be a post, pin, axle or other suitable structure.

The pivot 44-3 can be arranged generally perpendicular to the axis A of the clutch 20. In that way, the valve element 44-1 and the counterweight portion 44-2 pivotally move about the pivot 44-3 in a plane arranged generally perpendicular to the axis A, although in alternate embodiments the pivot 44-3 need not be precisely perpendicular to the axis A. The pivot 44-3 allows for relatively low-friction pivotal movement of the valve element 44-1 (and the counterweight portion 44-2).

The counterweight portion 44-2 can be an elongate member of a generally rectangular shape. In general, the counterweight portion 44-2 provides a mass located opposite of the valve element 44-1 that causes the valve system 44 to pivot under centrifugal loading, which occurs when the clutch 20 is in use and the reservoir cover 46 rotates with the housing 28. In order to fine-tune the mass of the counterweight portion 44-2, holes can be made as desired. Furthermore, an additional counterweight mass 44-2' can be attached to the counterweight portion 44-2, as shown in the embodiment of FIG. 3, to increase mass. Increased mass at or long the counterweight portion 44-2 can help quickly and reliably open the valve system 44.

Turning again to the illustrated embodiment of FIGS. 2A-2C, an outer edge 44-6 of the counterweight portion 44-2 is curved, in order to follow and complement a shape of the contacting member 44-5 and/or an outer edge shape of the reservoir cover 46. Such a shape of the edge 44-6 helps to reduce interference and increase an angular pivot range of the valve element 44-1. In the open position, as shown in FIG. 2B. the outer edge 44-6 can contact the contacting member 44-5, which can act as a stop, although such contact between the outer edge 44-6 and the contacting member 44-5 is not strictly necessary. In further embodiments, the outer edge 44-6 can have a different shape that is complementary to a local shape of the contacting member 44-6. Alternatively, the outer edge 44-6 can have a shape that is straight or otherwise different and non-complementary to the contacting member 44-5.

The biasing member 44-4 can be a suitable spring. In FIGS. 2A-2C, the biasing member 44-4 is a coil spring attached at one end to the counterweight portion 44-2 and at an opposite end to the reservoir cover 46, at a location radially inward from the counterweight portion 44-2, which operates in tension. In general, the biasing member 44-4 is configured to bias the valve element 44-1 to a closed position (as shown in FIG. 2A) covering the outlet bore 46-1. Therefore, in further embodiments the biasing member 44-4 can have other configurations, such as being attached to the valve element 44-1 and to the reservoir cover 46 at a location radially outward of the valve element 44-1.

During operation of the clutch 20, centrifugal forces acting on the counterweight portion 44-2 counteract the biasing force of the biasing member 44-4, causing the valve system 44 to pivot from the default closed position to the open position. In this way, when a torque input is provided to the clutch 20, centrifugal forces pivot the valve element 44-1 about the pivot 44-3 against the biasing force of the biasing element 44-4, and the valve element 44-1 moves to an open (disengaged) position that uncovers the outlet bore 46-1 at a threshold input speed. The particular threshold input speed at which the valve element 44-1 moves to the disengaged position can vary as a function of a spring constant of the biasing member 44-4, counterweighting characteristics of the counterweight portion 44-2 (and other portions of the system 44), and the spacing of the attachment point of the biasing member 44-3 from the pivot 44-3. As previously mentioned, the counterweight mass 44-2' can optionally be attached to the valve system 44 to help tailor the threshold input speed as desired for particular applications.

The contacting member 44-5 can be a ridge or rib that protrudes from the reservoir cover 46, and can be directly attached (i.e., rotationally fixed) to the reservoir cover 46-1 in a fixed relationship relative to both the bore 46-1 and the pivot 44-3, and, for instance, can be integrally and monolithically formed with the reservoir cover 46. In the illustrated embodiment, the contacting member 44-5 is a ridge that extends about an entire circumference of the reservoir cover 46 adjacent to the outlet bore 46-1 and at or near an outer diameter edge of the reservoir cover 46. During use, the contacting member 44-5 acts as a stop to arrest pivoting motion of the valve element 44-1 to help ensure that the valve element 44-1 covers and aligns with the outlet bore 46-1. The contacting member 44-5 can rotate with the reservoir cover 46, but does not move under centrifugal loading like the valve element 44-1.

In order to promote an effective seal, the valve element 44-1 can include a cam 44-1C and the contacting member 44-5 can also include a cam 44-5C. As best seen in FIG. 2C, the cams 44-1C and 44-5C are each beveled or chamfered edges. More particularly, in FIG. 2C the cam 44-1C is beveled to remove material of an outer edge of the valve element 44-1 facing away from the reservoir cover 46 (i.e., the edge of the valve element 44-1 is depleted further inward at a face that is away from the reservoir cover 46, thereby forming a wedge), and the cam 44-5C can be a notch or groove in the contacting member 44-5 angled or otherwise facing the reservoir cover 46 and having a complementary but opposing chamfered shape to that of the cam 44-1C. Engagement faces of the cams 441-C and 44-5C can be arranged parallel to one another (when engaged and in contact with each other), or alternatively in a non-parallel arrangement, when viewed in cross-section. The cam 44-1C can be located in close proximity to the area of the valve element 44-1 that covers the bore 46-1 when the valve system 44 is in the closed position. Moreover, the cam 44-1C can protrude (e.g., protruding outward as shown in FIGS. 2B and 2C) from a remainder of the valve element 44-1. The cam 44-5C can be a localized formation proximate the outlet bore 46-1, or can alternatively be a continuous groove about the entire circumference of the contacting member 44-5. The cams 44-1C and 44-5C can contact each other (due to biasing force provided by the biasing member 44-4) to create a camming or wedging effect to help press (i.e., force) the valve element 44-1 against the reservoir cover 46 (or other surface surrounding the bore 46-1) to help tighten a seal therebetween and reduce shear fluid leakage when the valve system 44 is in the closed position. The cams 44-1C and 44-5C can thereby improve sealing effectiveness and further reduce undesired leakage of the shear fluid that would otherwise tend to cause "morning sickness". Moreover, the cams 44-1C and 44-5C can operate only at a limited portion of the range of movement (i.e., stroke) of the valve element 44-1, such that a relatively low-friction movement of the valve element 44-1 is possible over most of the stroke but relative high sealing is possible at the end of the stroke (despite the increased friction between the valve element 44-1 and the reservoir cover 46) when the valve element 44-1 covers the bore 46-1.

While the valve system 44 has been described with respect to an outlet bore 46-1 in a reservoir cover 46, it should be noted that in further embodiments the valve system 44 can be positioned adjacent to nearly any boundary structure of the reservoir 38 in which the outlet bore 46-1 is located. Moreover, the valve system 44 is not dependent upon the direction of fluid flow through an associated bore or opening, and can also be used at an inlet bore or any other type of opening or bore in the reservoir 38.

In addition to the valve system 44, the clutch 20 can also optionally include a check valve (not shown) along the return bore 26-1B. Although the configuration of the return bore 26-1B shown in FIG. 1 does not present a significant risk of undesired shear fluid drainback, due to the outlet of the return bore 26-1B being close to the axis A, alternative embodiments of the clutch 20 with a return path through the housing 28 may benefit from use of the check-valve, which can be a pressure-operated or centrifugally-operated check valve of a known configuration. The check valve and the valve system 44 collectively obstruct all fluid paths to and out of the reservoir 38 when the clutch 20 is idle, thereby reducing or eliminating the problem of "morning sickness" while still allowing suitable controlled electromagnetic actuation of the viscous clutch 20 using the valve assembly 30.

Figure 4A:
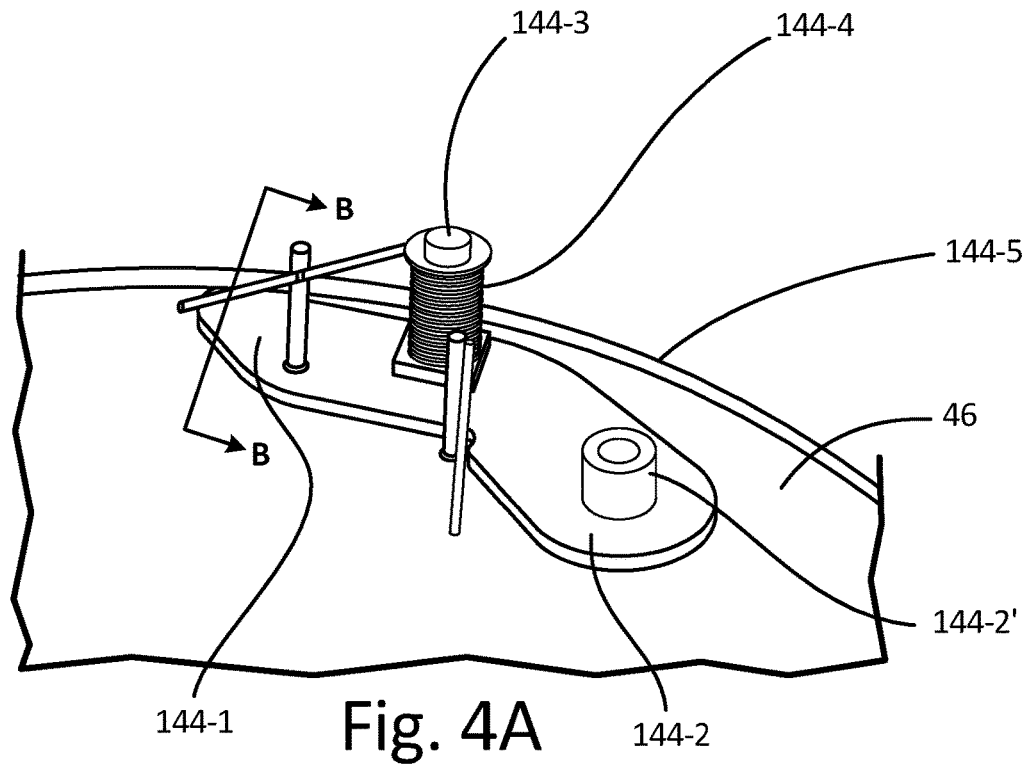
FIG. 4A is a perspective view of yet another embodiment of a morning sickness valve system according to the present invention.
Figure 4B:
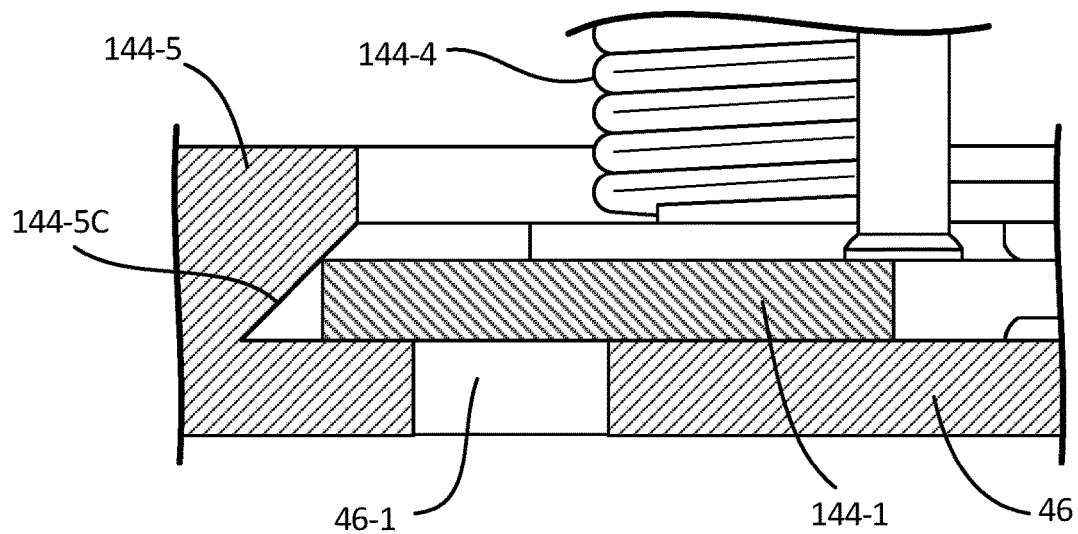
FIG. 4B is a cross-sectional view of the morning sickness valve system of FIG. 4A, taken along line B-B of FIG. 4A.

FIG. 4A is a perspective view of another embodiment of a morning sickness valve system 144, and FIG. 4B is a cross-sectional view of the valve system 144, taken along line B-B of FIG. 4A. The valve system 144 includes a valve element 144-1, a counterweight portion 144-2 and counterweight mass 144-2', a pivot 144-3, a biasing member 144-4, and a contacting member 144-5. In general, the valve system 144 operates similarly to the valve system 44. However, the valve system 144 has a number of differences.

First, the valve system 144 utilizes a biasing member 144-4 configured as a torsion spring, which can be engaged between posts or other suitable connecting structures on the valve element 144-1 (or alternatively the counterweight portion 144-2) and the reservoir cover 46. A coiled portion of the biasing member 144-4 can be wrapped about the pivot 144-3, or alternatively can be wrapped about a separate structure.

Second, contacting member 144-5 includes a cam 144-5C while the valve element 144-1 does not. That is to say that the valve element 144-1 can be configured as a generally flat plate with a generally rectangular edge facing and capable of contacting the cam 144-5C, which is configured with a chamfered notch angled toward the reservoir cover 46. In further embodiments, a cam could be located on the valve element 144-1 only, and a simple rectangular notch could be provided in the contacting member 144-5.

Figure 5:
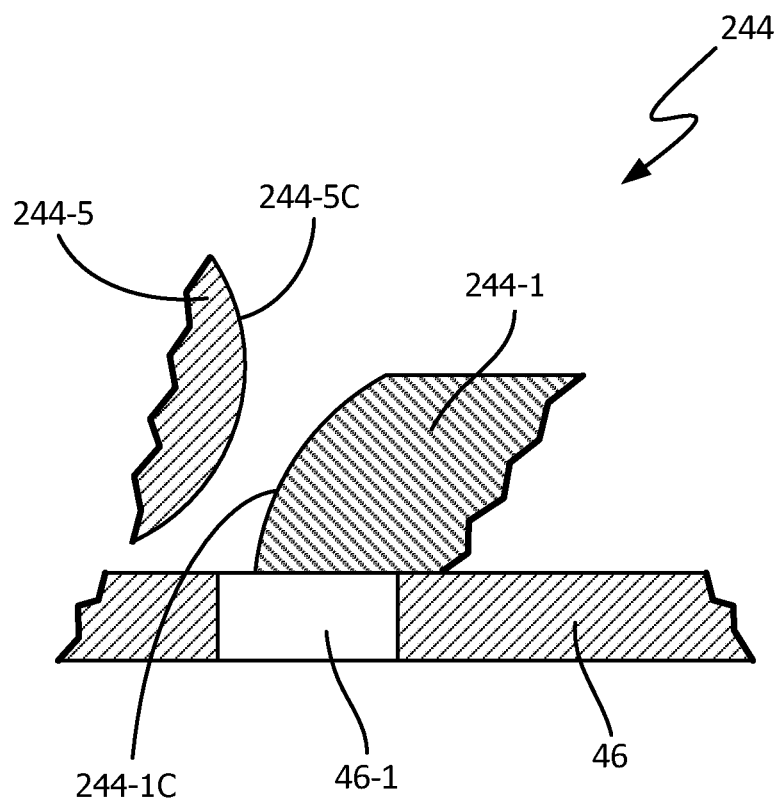
FIG. 5 is a cross-sectional view of a portion of another embodiment of a morning sickness valve system according to the present invention.

FIG. 6 is a cross-sectional view of a portion of yet another embodiment a morning sickness valve system 244. In the illustrated embodiment of FIG. 5, a valve element 244-1 has a cam 244-1C and a contacting member 244-5 has a cam 244-5C. The cams 244-1C and 244-5C can each be configured as mutually opposed, convexly curved surfaces.

In further embodiments, other cam shapes can be utilized, and cam shapes of various embodiments described above can be mixed-and-matched as desired for particular embodiments, such as a convexly curved cam used with a beveled or chamfered cam, a convexly curved cam used with another component lacking a cam, and the like. For instance, any suitable face cam structures can be utilized as desired for particular embodiments. Moreover, the valve element and the contacting member can have complementary shapes or different shapes.

Discussion of Possible Embodiments

The following are non-exclusive descriptions of possible embodiments of the present invention.

A valve system for reducing morning sickness effects in a viscous clutch having a reservoir with a bore, the valve system includes: a valve element; a counterweight portion; a pivot located in between the valve element and the counterweight portion, wherein the valve element and the counterweight portion are configured to commonly move about the pivot between open and closed positions; and a biasing member configured to bias the valve element to cover the bore in the closed position by default, wherein the counterweight portion is configured to counteract the biasing member under centrifugal loading such that the valve element at least partially uncovers the bore in the open position.

The valve system of the preceding paragraph can optionally include, additionally and/or alternatively, any one or more of the following features, configurations and/or additional components:

the valve element can further include a cam;

the cam can have a configuration selected from the group consisting of a bevel, a chamfer and a convex curved surface;

a contacting member, wherein the valve element can be configured to contact the contacting member when in the closed position;

the contacting member can be in a fixed position relative to the bore and/or the pivot;

the valve element further includes a cam, wherein the cam contacts the contacting member in the closed position;

the contacting member can further include an additional cam arranged to face the cam of the valve element;

the cam of the valve member and the additional cam of the contacting member can have complementary shapes;

the cam of the valve member and the additional cam of the contacting member can have opposing surfaces that are substantially parallel when viewed in cross-section when the valve member is in the closed position;

the cam of the valve member and the additional cam of the contacting member can have different shapes;

the contacting member can further include a cam; and/or the valve element and the contacting member create a face cam when in contact with each other in the closed position.

A method for reducing morning sickness in a viscous clutch having an input member, an output member and a reservoir with a bore includes: biasing a valve element carried with the input member to cover the bore of the reservoir by default; and pivoting the valve element to at least partially uncover the bore as a function of centrifugal loading.

The method of the preceding paragraph can optionally include, additionally and/or alternatively, any one or more of the following steps, features, configurations and/or additional components:

engaging a cam to press the valve element against a surface surrounding the bore to facilitate sealing;

the cam can be engaged over only a portion of a stroke of the valve element when the valve element reaches the closed position; and/or selectively actuating a primary valve assembly to cover the bore, wherein the primary valve assembly is positioned to cover a first end of the bore, and wherein the valve element is positioned to cover an opposite second end of the bore.

An assembly for a viscous clutch includes: a reservoir boundary wall having a bore that permits fluid flow, the bore having a first end and an opposite second end; a primary valve assembly controllable to selectively cover and uncover the bore at the first end to regulate fluid flow through the bore, wherein the primary valve assembly is biased to uncover the bore by default; and a morning sickness valve system moveable to cover and uncover the bore at the second end to reduce fluid flow at an idle condition, the morning sickness valve system being operable independent of the primary valve assembly. The morning sickness valve system includes: a valve element; a counterweight portion; a pivot located in between the valve element and the counterweight portion, wherein the valve element and the counterweight portion are configured to commonly move about the pivot between open and closed positions; and a biasing member configured to bias the valve element to cover the bore in the closed position by default, wherein the counterweight portion is configured to counteract the biasing member under centrifugal loading such that the valve element at least partially uncovers the bore in the open position.

The assembly of the preceding paragraph can optionally include, additionally and/or alternatively, any one or more of the following features, configurations and/or additional components:

a contacting member arranged in a fixed relationship relative to the pivot and located proximate the bore, wherein the valve element of the morning sickness valve system is configured to contact the contacting member when in the closed position;

the contacting member can be curved, and the counterweight portion can have a curved outer edge that is complementary to curvature of the contacting member.

at least one of the valve element and the contacting member can further include a cam configured to press the valve element against the reservoir boundary wall when the valve element is in the closed position; and/or the cam can have a configuration selected from the group consisting of a bevel, a chamfer and a convex curved surface.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Although the present invention has been described with reference to preferred embodiments, workers skilled in the art will recognize that changes may be made in form and detail without departing from the spirit and scope of the invention. For instance, features of any given embodiment can generally be utilized with any other embodiment, as desired for particular applications, or utilized in isolation.

The invention claimed is:

1. A valve system for reducing morning sickness effects in a viscous clutch having a reservoir with a bore, the valve system comprising:
    a valve element, wherein the valve element includes a cam;
    a counterweight portion;
    a pivot located in between the valve element and the counterweight portion, wherein the valve element and the counterweight portion are configured to commonly move about the pivot between open and closed positions; and
    a biasing member configured to bias the valve element to cover the bore in the closed position by default, wherein the counterweight portion is configured to counteract the biasing member under centrifugal loading such that the valve element at least partially uncovers the bore in the open position.

2. The valve system of claim 1, wherein the cam has a configuration selected from the group consisting of a bevel, a chamfer and a convex curved surface.

3. The valve system of claim 1 and further comprising:
    a contacting member, wherein the valve element is configured to contact the contacting member when in the closed position.

4. The valve system of claim 3, wherein the cam contacts the contacting member in the closed position.

5. The valve system of claim 4, wherein the contacting member further includes an additional cam arranged to face the cam of the valve element.

6. The valve system of claim 5, wherein the cam of the valve member and the additional cam of the contacting member have complementary shapes.

7. The valve system of claim 5, wherein the cam of the valve member and the additional cam of the contacting member have opposing surfaces that are substantially parallel when viewed in cross-section when the valve member is in the closed position.

8. The valve system of claim 5, wherein the cam of the valve member and the additional cam of the contacting member have different shapes.

9. The valve system of claim 3, wherein the valve element and the contacting member create a face cam when in contact with each other in the closed position.

10. A valve system for reducing morning sickness effects in a viscous clutch having a reservoir with a bore, the valve system comprising:
    a valve element;
    a counterweight portion;
    a pivot located in between the valve element and the counterweight portion, wherein the valve element and the counterweight portion are configured to commonly move about the pivot between open and closed positions;
    a biasing member configured to bias the valve element to cover the bore in the closed position by default, wherein the counterweight portion is configured to counteract the biasing member under centrifugal loading such that the valve element at least partially uncovers the bore in the open position; and
    a contacting member, wherein the valve element is configured to contact the contacting member when in the closed position, wherein the contacting member includes a cam.

11. A method for reducing morning sickness in a viscous clutch having an input member, an output member and a reservoir with a bore, the method comprising:
    biasing a valve element carried with the input member to cover the bore of the reservoir by default;
    pivoting the valve element to at least partially uncover the bore as a function of centrifugal loadings; and
    selectively actuating a primary valve assembly to cover the bore, wherein the primary valve assembly is positioned to cover a first end of the bore, and wherein the valve element is positioned to cover an opposite second end of the bore.

12. The method of claim 11 and further comprising:
    engaging a cam to press the valve element against a surface surrounding the bore to facilitate sealing.

13. The method of claim 12, wherein the cam is engaged over only a portion of a stroke of the valve element when the valve element reaches a closed position covering the bore of the reservoir.

14. An assembly for a viscous clutch, the assembly comprising:
    a reservoir boundary wall having a bore that permits fluid flow, the bore having a first end and an opposite second end;
    a primary valve assembly controllable to selectively cover and uncover the bore at the first end to regulate fluid flow through the bore, wherein the primary valve assembly is biased to uncover the bore by default; and
    a morning sickness valve system moveable to cover and uncover the bore at the second end to reduce fluid flow at an idle condition, the morning sickness valve system being operable independent of the primary valve assembly,
    wherein the morning sickness valve system comprises:
    a valve element;
    a counterweight portion;
    a pivot located in between the valve element and the counterweight portion, wherein the valve element and the counterweight portion are configured to commonly move about the pivot between open and closed positions; and a biasing member configured to bias the valve element to cover the bore in the closed position by default, wherein the counterweight portion is configured to counteract the biasing member under centrifugal loading such that the valve element at least partially uncovers the bore in the open position.

15. The assembly of claim 14 and further comprising:
a contacting member arranged in a fixed relationship relative to the pivot and located proximate the bore, wherein the valve element of the morning sickness valve system is configured to contact the contacting member when in the closed position.

16. The assembly of claim 15, wherein the contacting member is curved, and wherein the counterweight portion has a curved outer edge that is complementary to curvature of the contacting member.

17. The assembly of claim 15, wherein at least one of the valve element and the contacting member further includes a cam configured to press the valve element against the reservoir boundary wall when the valve element is in the closed position.

18. The assembly of claim 17, wherein the cam has a configuration selected from the group consisting of a bevel, a chamfer and a convex curved surface.

* * * * *

UNITED STATES PATENT AND TRADEMARK OFFICE
CERTIFICATE OF CORRECTION

| | |
|---|---|
| PATENT NO. | : 10,578,171 B2 |
| APPLICATION NO. | : 15/758517 |
| DATED | : March 3, 2020 |
| INVENTOR(S) | : Michael Stevens and James Preston |

It is certified that error appears in the above-identified patent and that said Letters Patent is hereby corrected as shown below:

In the Claims

In Claim 11, Column 14, Line 36:
Please delete "bore as a function of centrifugal loadings; and"
And insert --bore as a function of centrifugal loading; and--

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*